Sept. 5, 1961 W. RIMMER 2,998,944
DELAY MECHANISM
Filed Dec. 15, 1958 2 Sheets-Sheet 1

INVENTOR.
W. RIMMER
BY
ATTORNEYS.

Sept. 5, 1961  W. RIMMER  2,998,944
DELAY MECHANISM
Filed Dec. 15, 1958  2 Sheets-Sheet 2

INVENTOR.
W. RIMMER

ATTORNEYS.

2,998,944
DELAY MECHANISM
William Rimmer, University Park, Md., assignor to the United States of America as represented by the Secretary of the Navy
Filed Dec. 15, 1958, Ser. No. 780,640
2 Claims. (Cl. 244—14)
(Granted under Title 35, U.S. Code (1952), sec. 266)

The invention described herein may be manufactured and used by or for the Government of the United States of America for governmental purposes without the payment of any royalties thereon or therefor.

This application relates generally to a submarine-launched rocket and is more particularly concerned with novel igniter delay mechanism for lighting off the solid propellant rocket motor of a missile ejected from a torpedo tube of a submerged submarine.

The problems encountered in the firing of a missile under water are unique in the field of missilery. All component parts of the missile must function under extreme ambient pressures both prior to, and subsequent to motor light off. Furthermore, when a missile is launched from an underwater platform, such as a submarine, the ignition of the missile must be delayed until after launching. This is contrary to the standard procedure in which the launching thrust is provided by the missile rocket motor. The reason for this is that ignition of a rocket motor underwater initiates cavitation in the water near the rocket thrust nozzles. The bubble formed causes a severe shock wave capable of buckling the plates of the launching submarine as it passes across the submarine. This may be considered to be analogous to the "bubble effect" well known in the field of underwater ordnance.

Underwater rocket ignition also throws debris rearwardly which may foul the torpedo tube doors of the submarine or the torpedo tubes themselves if the rocket is lighted off too close to the submarine. Accordingly, it is necessary to launch a missile, pneumatically or hydraulically and allow it to coast a minimum safe distance from the launching submarine before the rocket motor ignition.

It is one object of this invention to provide a time delay mechanism for a rocket motor which mechanism will function submerged at a depth of several hundred feet of water.

Another object is to provide a new and improved timer for a rocket igniter which is adjustable to give a selected delay time.

Still another object is the provision of a time delay mechanism for a missile which may be monitored when it is set in an armed position.

A further object is to provide a novel time delay mechanism which is compact and rugged and which can be set and reset selectively from armed to firing position any number of times without the use of special tools and without undue wear.

These and many other objects will become more clearly apparent to those skilled in the art when the following specification is read and considered along with the attendant drawings wherein like numerals designate like or similar parts throughout the several views and in which.

Figure 1:
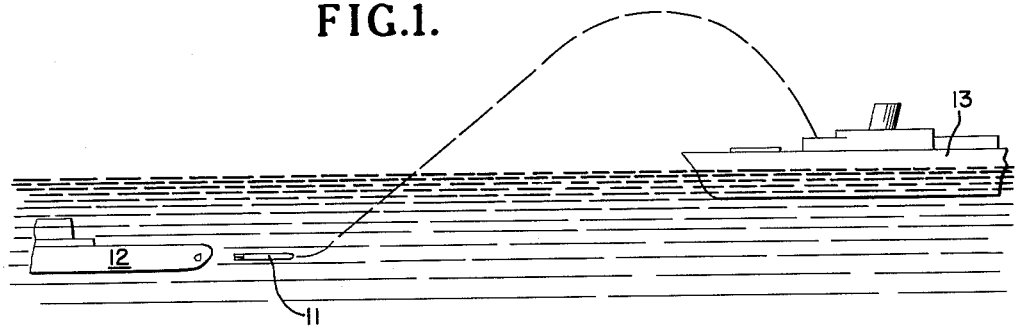
FIG. 1 is a diagrammatic representation of the flight of a missile launched from a submerged submarine.
Figure 4:
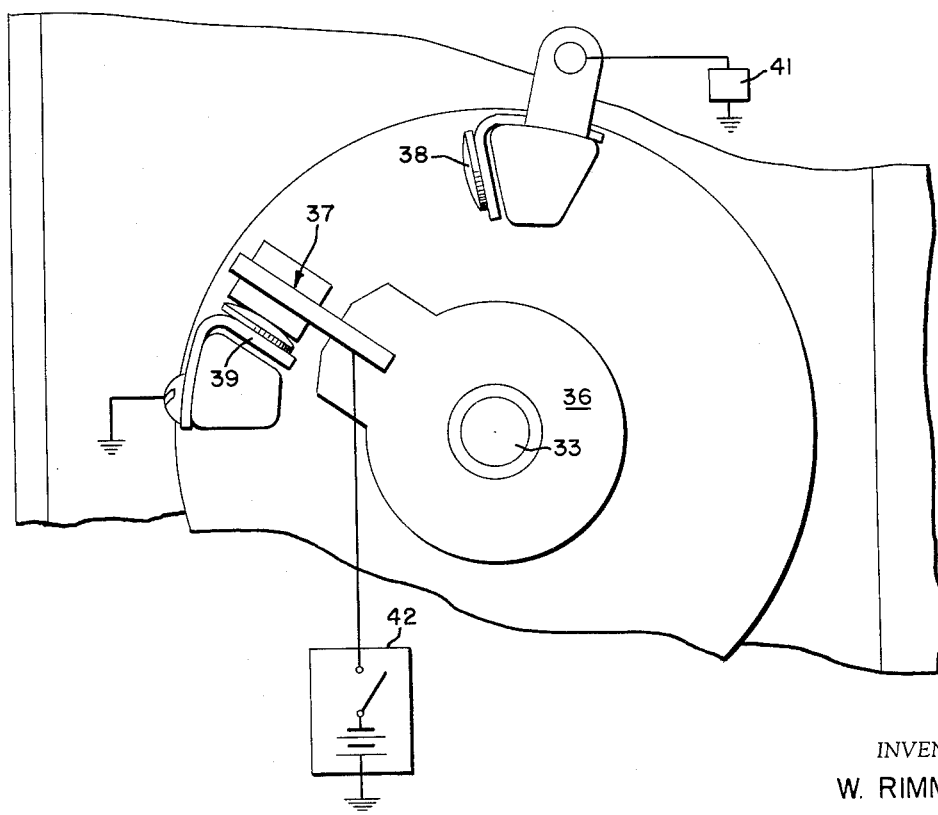
FIG. 4 is a view taken along line 4—4 of FIG. 3 looking in the direction of the arrow.
Figure 3:
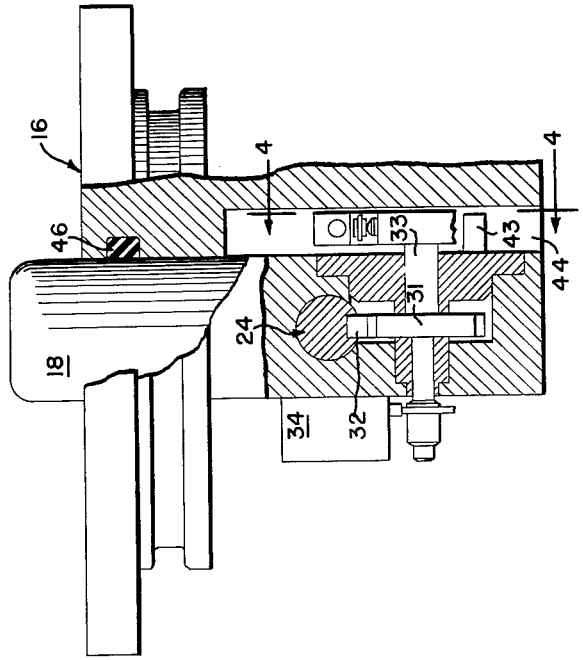
FIG. 3 is a cross-section taken along line 3—3 of FIG. 2 with certain parts removed viewed in the direction of the arrows.

Referring with greater particularity to FIG. 1, a solid propellant missile 11 is launched from a submarine 12 in much the same manner as a conventional torpedo is fired. The missile 11 continues to move through the water for about 30–50 feet before the rocket motor is lighted off then missile 11 is programmed upwardly out of the water and flies to the target 13. Although the target has been indicated as a surface ship, this is by way of illustration only, as it is to be understood that the potential target may also be an undersea craft, aircraft or a land target.

Figure 2:
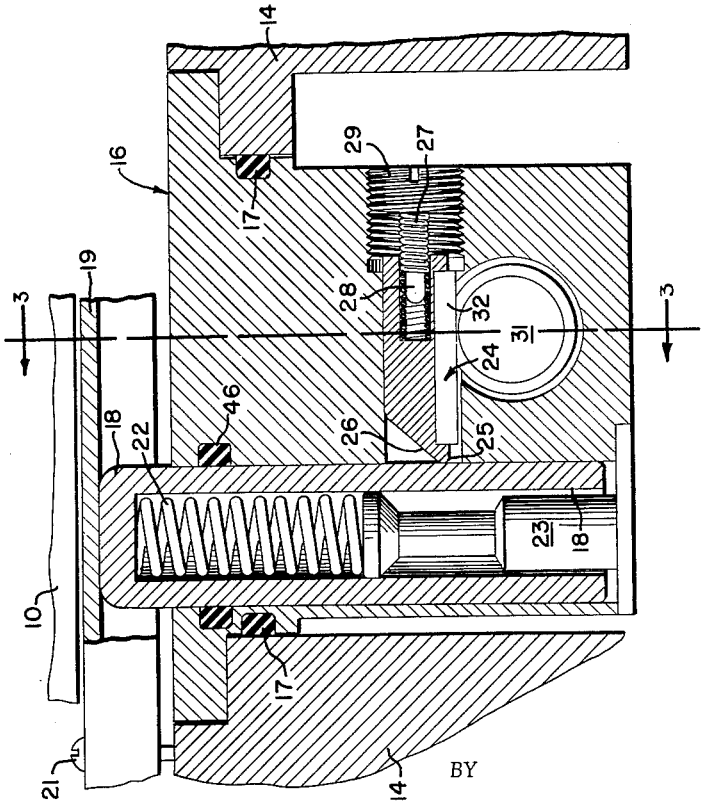
FIG. 2 is a cross-sectional view of a time delay mechanism embodying the principles of this invention.

As indicated in FIG. 2, the missile body 14 has a recess formed therein to receive the housing of the delay mechanism indicated generally at 16, a sealing ring 17 prevents sea water from entering the recess. A tubular plunger 18 in the mechanism 16 is restrained in the safe position by a U-shaped arming bar 19. One end of the arming bar releasably engages a notch or the like (not shown) in the outer surface of missile 11 and is secured to the missile by shear pin 21 immediately prior to loading. When the missile is loaded into the torpedo tube this pin is removed or broken so that the arming bar rides in a groove in the torpedo tube and is held in place by contact with the torpedo tube wall 10. The plunger 18 fits into the channel of arming bar 19 and is held in the unarmed position by the bar.

Disposed within the tubular plunger is a compression spring 22 which acts against a pedestal 23 fixed within the housing of timing mechanism 16 and acts against one end of spring 22 thereby urging plunger 18 upward as seen in FIG. 2, against the restraining force of the arming bar.

A rack 24 fits within a transverse bore formed within the housing of time delay mechanism 16 disposed at about 90° with respect to the plunger. Rack 24 is toothed only along a portion of its length and has a rather sharp taper 26 terminating in a rounded end 25 which abuts plunger 18 thereby preventing excess friction and undue wear as the plunger travels upward under the influence of spring 22. Rack 24 is urged toward the plunger by spring 27 which is disposed over a projecting finger 28 fixed to a slotted cap 29. This cap is threaded into one end of bore so that the compression on spring 27 and consequently the time delay inherent in the operation of this mechanism can be altered merely by removing the timing mechanism from the missile and adjusting the position of cap 29 in the bore by a simple screw driver adjustment.

A gear 31 engages the toothed portion 32 of rack 24 so that as the rack moves, gear 31 rotates along with its shaft 33. The speed of revolution of shaft 33 is controlled by an escapement mechanism indicated generally at 34, which is geared to one end of the shaft. Escapement 34 preferably includes a pawl arrangement in order to prevent binding or stripping of its gears when the delay mechanism is cocked by depressing plunger 18. The opposite end of shaft 33 is fixed to an electrically insulating disc 36 carrying a moveable electrical contact 37. This contact operates between two fixed contacts 38 and 39 respectively. Contact 38 is electrically connected to the igniter indicated generally at 41 while contact 37 is connected to the source 42 of the firing pulse. Contact 39 is utilized as a monitor contact during the testing of the igniter delay mechanism to determine the time required for contact 37 to travel between contacts 38 and 39. During tactical operation of the missile, contact 39 may conveniently be thought of as an open circuit.

When the plunger is held down by arming bar 19, contacts 37 and 39 are connected so that if the firing pulse is prematurely generated by some accident or malfunctioning of the firing circuit 42 the firing pulse will not be sent to the igniter.

Upon ejection of the missile from the torpedo tube of the submarine, arming bar 19 flies off, and the hollow plunger springs past the end of rack 24 thereby allowing the rack to move to the left as seen in the drawings.

The open end of plunger 13 extends about an inch below its point of contact with rack 24 to allow for variations in the internal diameter of various types of torpedo tubes such, for example, as hydraulic tubes and pneumatic tubes. Otherwise, an oversize torpedo tube might permit the plunger to rise sufficiently to release rack 24 while the missile is still in the torpedo tube. Stop 43 on plunger 18 operating in a blind groove 44 adjacent to plunger 18 prevents the plunger and spring from being completely ejected and lost during testing of the delay mechanism and with O ring 46 seals the mechanism from external water pressure until delay time has been completed. The movement of the rack rotates shaft 33 via gear 31 thus switching contact 37 from monitor contact 39 to the igniter contact 38 to permit ignition of the rocket motor when a firing pulse is received from circuit 42. The speed of travel between these contacts is governed by the tension on spring 27 and the restraining force of the escapement mechanism.

From the foregoing, it should be apparent to those skilled in the art that this invention is especially useful in the field of underwater launched ordnance since it solves a problem unique to that art. Accordingly, this invention is not to be construed as limited by the specific example described but is defined only by the following claims.

What is claimed as new and desired to be secured by Letters Patent of the United States is:

1. A delay mechanism for a submarine-torpedo tube-launched missile comprising: a rack having a toothed section along a portion of its length, said rack having an untoothed beveled portion terminating in a rounded end, a geared shaft cooperating with the toothed section of said rack for rotation upon movement of said rack, escapement means coupled to said shaft to control the rate of rotation thereof, a spring actuated plunger in contact with the rounded end of said rack and projecting a substantial distance beyond said rounded end to prevent movement of said rack, an arming bar lying on the outer surface of the missile and cooperating with the torpedo tube wall and with said plunger while the missile is in the torpedo tube to restrain said plunger in position, whereby said plunger is released and moves past the end of the rack when the missile leaves the torpedo tube, spring biasing means cooperating with said rack to move said rack and rotate the geared shaft when the plunger moves past the end of said rack, thereby rotating said shaft to initiate a suitable operation after the missile leaves the submarine.

2. An igniter delay mechanism according to claim 1 further comprising means abutting said spring biasing means to selectively vary the compression on said spring thereby to adjust the speed of travel of said rack.

References Cited in the file of this patent

UNITED STATES PATENTS

| | | |
|---|---|---|
| 2,429,615 | Glennon et al. | Oct. 28, 1947 |
| 2,836,118 | Hjelm | May 27, 1958 |